US010935717B2

(12) United States Patent
Shimojoh

(10) Patent No.: US 10,935,717 B2
(45) Date of Patent: Mar. 2, 2021

(54) LIGHTING DEVICE AND LIQUID CRYSTAL DISPLAY DEVICE

(71) Applicant: SHARP KABUSHIKI KAISHA, Sakai (JP)

(72) Inventor: Kazuya Shimojoh, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/664,212

(22) Filed: Oct. 25, 2019

(65) Prior Publication Data
US 2020/0142124 A1 May 7, 2020

Related U.S. Application Data

(60) Provisional application No. 62/755,703, filed on Nov. 5, 2018.

(51) Int. Cl.
*F21V 8/00* (2006.01)

(52) U.S. Cl.
CPC ......... *G02B 6/0078* (2013.01); *G02B 6/0088* (2013.01); *G02B 6/0055* (2013.01)

(58) Field of Classification Search
CPC ... G02B 6/0078; G02B 6/0088; G02B 6/0055
See application file for complete search history.

(56) References Cited

U.S. PATENT DOCUMENTS

| 8,894,265 B2* | 11/2014 | Chang | G02B 6/0068 349/65 |
| 9,360,701 B2* | 6/2016 | Momose | G02B 6/0046 |
| 2006/0187528 A1* | 8/2006 | Hagood | G02B 26/02 359/298 |
| 2008/0101068 A1* | 5/2008 | Kitamura | G02B 6/0078 362/246 |
| 2008/0211990 A1* | 9/2008 | Sakai | G02B 6/0078 349/64 |
| 2009/0109672 A1* | 4/2009 | Lai | G02B 6/0021 362/238 |
| 2010/0165236 A1* | 7/2010 | Bae | G02B 6/0021 349/58 |
| 2019/0383992 A1* | 12/2019 | Sekiguchi | G02B 6/0078 |
| 2020/0064535 A1* | 2/2020 | Haan | G02B 6/0038 |

FOREIGN PATENT DOCUMENTS

JP 2010-055771 A 3/2010

* cited by examiner

*Primary Examiner* — Anabel Ton
(74) *Attorney, Agent, or Firm* — ScienBiziP, P.C.

(57) ABSTRACT

A lighting device includes a light guide plate including a groove on one of a pair of plate surfaces thereof, the groove dividing the one of the pair of plate surfaces into areas each of which includes a portion of an outer peripheral surface, and a light source providing light such that the light enters each of the areas through the portion of the outer peripheral surface thereof. The light source is configured to control light that enters each of the areas such that luminance of light exiting the light guide plate through a light exit surface that is one of a pair plate surfaces thereof is made different in each of the areas.

16 Claims, 3 Drawing Sheets

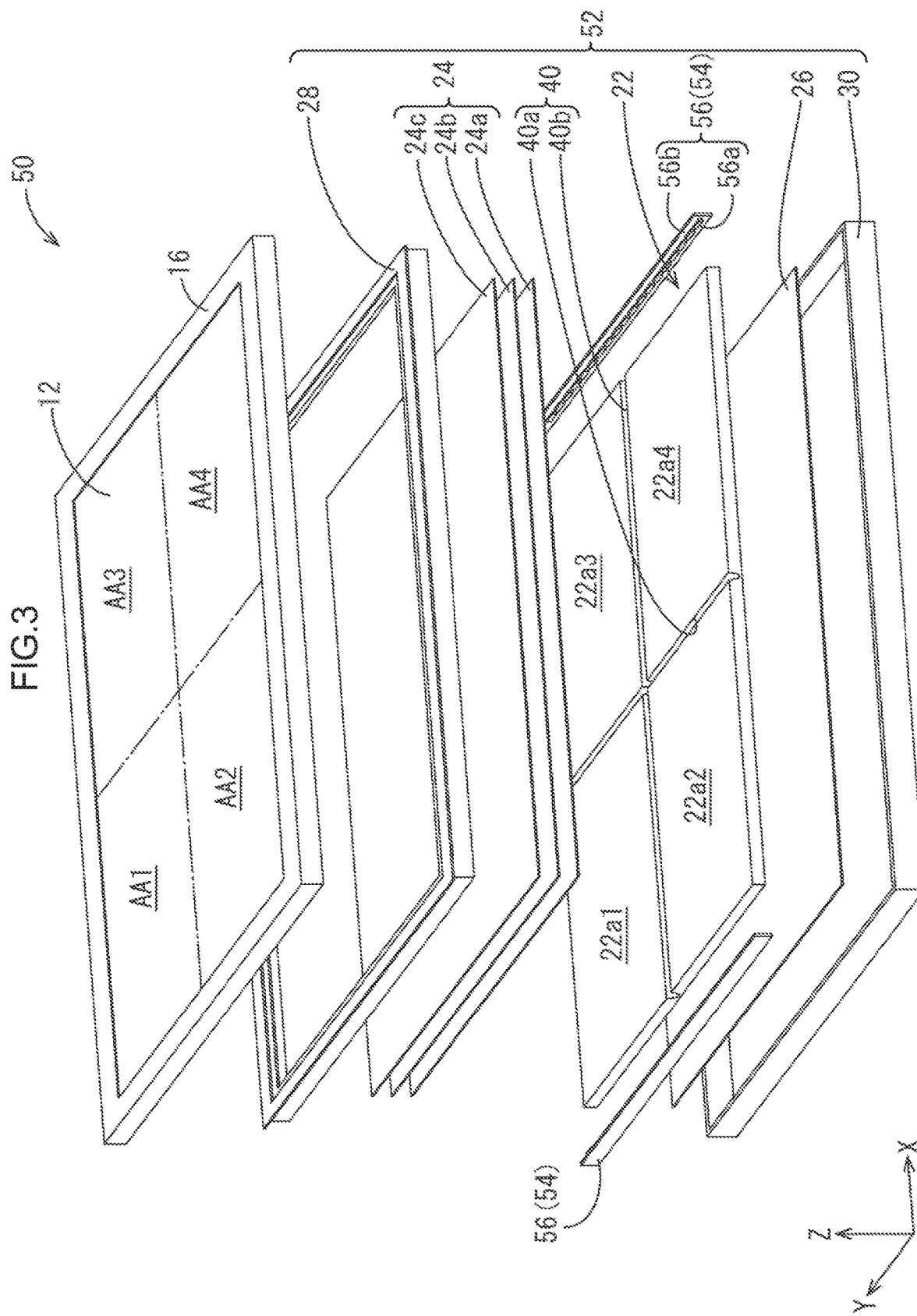

LIGHTING DEVICE AND LIQUID CRYSTAL DISPLAY DEVICE

CROSS REFERENCE TO RELATED APPLICATION

This application claims priority from U.S. Provisional Patent Application No. 62/755,703 filed on Nov. 5, 2018. The entire contents of the priority application are incorporated herein by reference.

TECHNICAL FIELD

The technology described herein relates to a lighting device and a liquid crystal display device including the lighting device.

BACKGROUND ART

A lighting device that is included in a liquid crystal display device has been known. Japanese Unexamined Patent Application Publication No. 2010-55771 describes a lighting device that includes a light source and a light guide plate and is configured such that light from the light source enters the light guide plate through an outer peripheral surface thereof and the light exits the light guide plate through one of a pair of plate surfaces thereof and supply light to a component to be lighted. In the lighting device, the light guide plate includes light guide units and is characterized in that each of the light guide units is optically separated from each other and light luminance can be adjusted for every light guide unit (area control).

However, the lighting device necessarily includes reflection sheets between the light guide units to include multiple light guide units and optically separate the light guide units from each other. This increases the number of parts and complicates a producing process.

SUMMARY

The technology described herein was made in view of the above circumstances. An object is to control luminance for every area with a simple structure.

A lighting device according to the technology described herein includes a light guide plate including a groove on one of a pair of plate surfaces thereof, the groove dividing the one of the pair of plate surfaces into areas each of which includes a portion of an outer peripheral surface, and a light source providing light such that the light enters each of the areas through the portion of the outer peripheral surface thereof. The light source is configured to control light that enters each of the areas such that luminance of light exiting the light guide plate through a light exit surface that is one of a pair plate surfaces thereof is made different in each of the areas.

A liquid crystal display device according to the technology described herein includes the lighting device, and a liquid crystal panel displaying an image with using light from the lighting device. The liquid crystal panel includes divided areas in a screen surface thereof and is configured to display images at a same time, and the light guide plate of the lighting device includes a groove along a border between the images displayed on the liquid crystal panel.

According to the technology described herein, luminance can be controlled for every area with a simple structure.

BRIEF DESCRIPTION OF THE DRAWINGS

FIG. 3 is an exploded perspective view of a liquid crystal display device according to a second embodiment.

DETAILED DESCRIPTION

Embodiments of the present technology will be described with reference to the drawings in detail as embodiments for carrying out the present technology. The present technology is not necessarily limited to the following embodiments but may be carried out in various embodiments with modifications or improvement based on knowledges of those who have skills in the art.

First Embodiment

Figure 1:
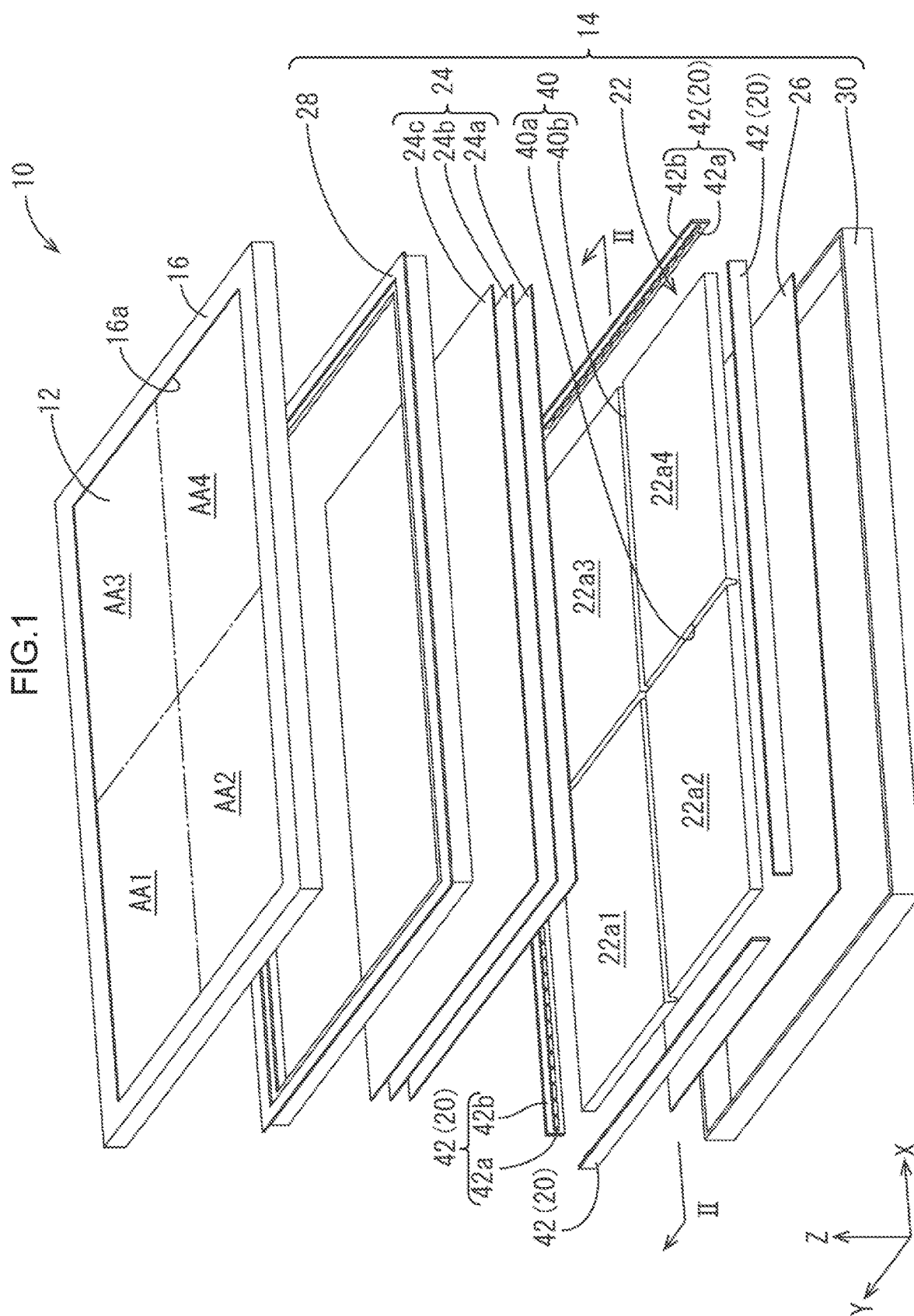
FIG. 1 is an exploded perspective view of a liquid crystal display device according to a first embodiment.
Figure 2:
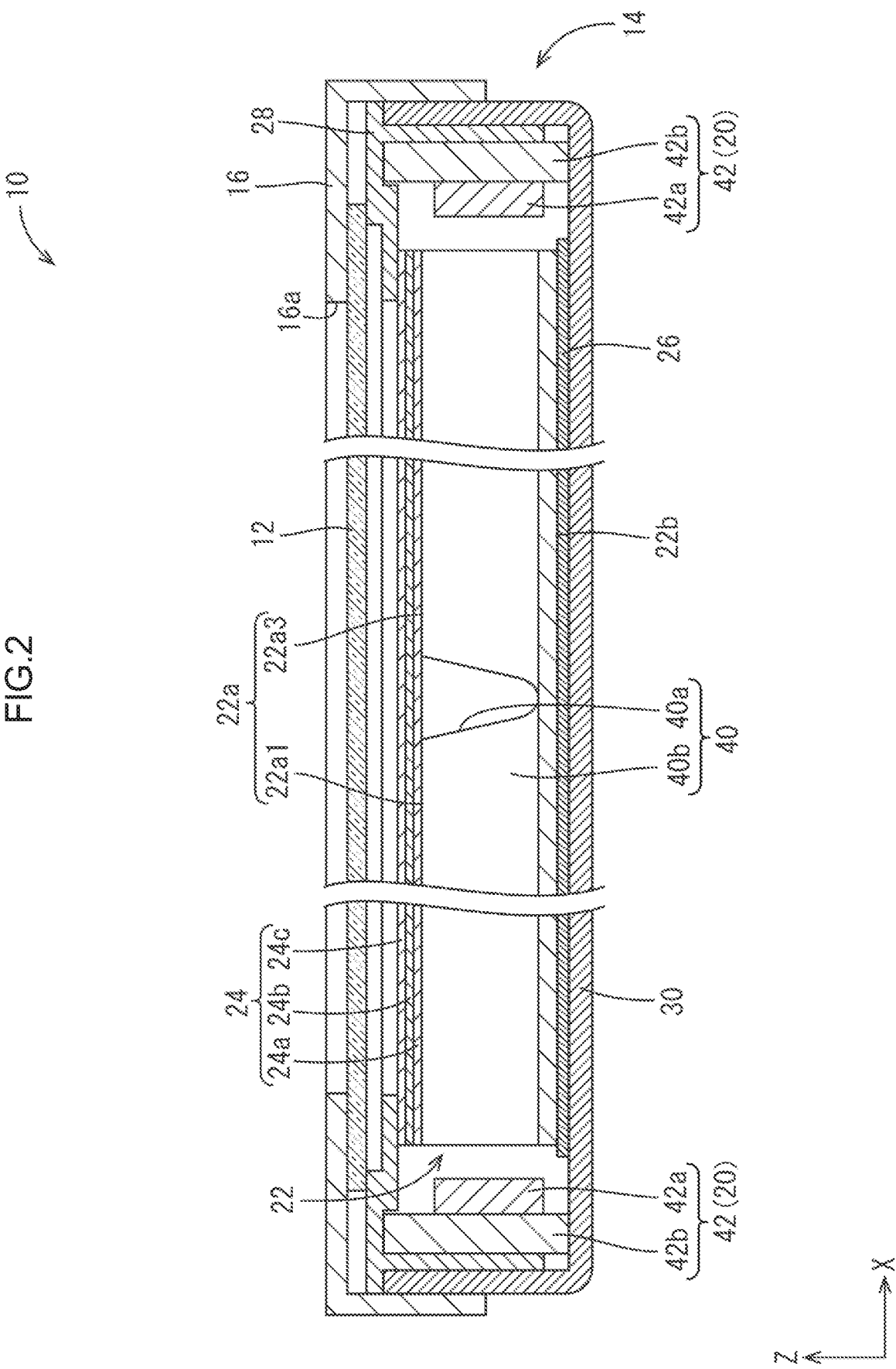
FIG. 2 is a cross-sectional view of a display device according to the first embodiment.

A liquid crystal display device 10 according to a first embodiment is illustrated in the exploded perspective view of FIG. 1 and the cross-sectional view of FIG. 2. As illustrated in FIG. 1, the liquid crystal display device 10 has an elongated quadrangular overall shape. The liquid crystal display device 10 includes a liquid crystal panel 12 as a display panel that displays an image, and a backlight unit 14 that is a lighting device and supplies light to the liquid crystal panel 12 for displaying an image. The liquid crystal display device 10 may be used for a portable information terminals such as a smartphone but not be limited thereto. X-axes, Y-axes, and Z-axes may be present in the drawings. The axes in each drawing correspond to the respective axes in other drawings. In the liquid crystal display device 10, a short-side direction corresponds to a Y-axis direction in each drawing and a long-side direction corresponds to an X-axis direction in each drawing. A direction perpendicular to an X-Y plane corresponds to a Z-axis direction and may be referred to as a vertical direction or a front-rear direction with reference to FIG. 2.

The liquid crystal panel 12 includes a pair of substrates that are substantially transparent and highly transmissive, and a liquid crystal layer that is disposed between the pair of substrates. The liquid crystal layer includes liquid crystal molecules that are substances whose optical characteristics are varied according to application of an electric field. Details of a structure of the liquid crystal panel 12 are not illustrated. One of the pair of substrates is an array substrate that includes thin film transistors (TFTs), which are switching components, pixel electrodes, gate lines, and source lines on a transparent glass substrate. The TFTs and the pixel electrodes are arranged in a matrix (rows and columns) and the gate lines and the source lines are arranged in a grid to surround the TFTs and the pixel electrodes. Another one of the pair of substrates is a color filter substrate that includes color filters on a transparent glass substrate. The color filters are disposed corresponding to the respective pixel electrodes. As illustrated in FIG. 1, the liquid crystal panel 12 has a display area that is divided into four areas AA1, AA2, AA3, AA4 and is configured to display four images simultaneously.

In FIG. 1, the liquid crystal panel 12 is mounted in a bezel 16. The bezel 16 has an open section 16a through which an image displayed on the display area of the liquid crystal panel 12 can be seen from outside. The bezel 16 holds the liquid crystal panel 12 and a backlight unit 14, which will be described later.

The backlight unit 14 is disposed behind the liquid crystal panel 12 and is configured to supply light toward the liquid crystal panel 12. The backlight unit 14 includes a light source 20, a light guide plate 22, an optical sheet 24, a light reflection sheet 26, a frame 28, and a case 30. The light guide plate 22 has a substantially quadrangular plate shape and light from the light source 20 travels within the light guide plate 22. The optical sheet 24 is disposed on a front side of the light guide plate 22. The light reflection sheet 26 is disposed on a back side of the light guide plate 22. The frame 28 has a shape that surrounds the light guide plate 22 and the optical sheet 24. The case 30 has a substantially box shape that opens toward the front side (the liquid crystal panel 12 side).

The case 30 is, for example, formed of an aluminum plate of a metal plate such as an electrogalvanized steel plate (SECC). The case 30 has a substantially box shape that opens toward the front side (the liquid crystal panel 12 side), as described before. Various components such as the light source 20, the light guide plate 22, the optical sheet 24, and the light reflection sheet 26 are arranged within the case 30. Boards such as a control board and an LED driving board are mounted outside the case 30.

The light reflection sheet 26 is arranged in the case 30 so as to cover a bottom surface. The light reflection sheet 26 is a sheet member having good light reflectivity and made of white foamed polyethylene terephthalate (one example of a white plastic sheet), for example. Next, the light guide plate 22 is arranged on the light reflection sheet 26 in the case 30. The light guide plate 22 is made of synthetic resin material that has a refractive index sufficiently higher than that of air and is substantially transparent and highly transmissive (for example, acrylic resin such as PMMA, polycarbonate resin). The light guide plate 22 is a plate member having a substantially quadrangular plan view shape similar to the liquid crystal panel 12 and has a pair of plate surfaces. A front surface 22a of the plate surfaces is opposite the liquid crystal panel 12 and a back surface 22b thereof is opposite the light reflection sheet 26.

In the backlight unit 14 of the present embodiment, the light guide plate 22 includes a groove 40 on the front surface 22a. The groove 40 includes a lateral groove 40a and a vertical groove 40b. The vertical groove 40b is in a middle of the front surface 22a with respect to the Y-axis direction (the short-side direction) and extends in the X-axis direction (the long-side direction). The lateral groove 40a is in a middle of the front surface 22a with respect to the X-axis direction and extends in the Y-axis direction. Namely, the groove 40 formed in the light guide plate 22 has a cross shape. Accordingly, the front surface 22a of the light guide plate 22 is divided into four surfaces 22a1, 22a2, 22a3, 22a4. Each of the lateral groove 40a and the vertical groove 40b extends from an outer periphery of one side to an outer periphery of another one side that is parallel to and opposite from the one side. The groove 40 has a depth that is greater than a half of a thickness of the light guide plate 22. The depth of the groove 40 is about 90% of the thickness. Namely, the light guide plate 22 has an outer peripheral surface that is also divided into almost four sections. As described before, the light guide plate 22 is divided into the four areas by the groove 40 such that each of the areas includes a portion of the outer peripheral surface.

The optical sheet 24 is arranged on the light guide plate 22 in the case 30. The optical sheet 24 includes a micro lens sheet 24a that provides light with an isotropic light collecting function, a prism sheet 24b that provides light with an anisotropic light collecting function, and a reflection type polarizing sheet 24c that reflects light with polarizing. The micro lens sheet 24a, the prism sheet 24b, and the reflection type polarizing sheet 24c are stacked on each other from the back side in this order. Kinds and number of the sheets included in the optical sheet 24 can be altered as appropriate.

Furthermore, the light source 20 that supplies light to the light guide plate 22 is also arranged in the case 30. The light source includes four LED units 42. Each LED unit 42 includes light emitting diodes (LEDs) 42a and a LED board 42b on which the LEDs 42a are mounted. Each LED 42a is configured by enclosing LED chips with sealing material. The LED chip emits light of a single color such as blue light and phosphors (yellow phosphors, green phosphors, red phosphors) are dispersed in the sealing material with which the LED chip is enclosed, and each LED 42a emits substantially white light as a whole. The configuration of the LED 42a is not necessarily limited to the above but may be altered as appropriate. The LED board 42b is a film shape (a sheet) made of insulation material and having flexibility. The LEDs 42a are mounted on the LED board 42b at intervals. The LEDs 42a are arranged at equal intervals but may not be limited thereto. The four LED units 42 are arranged to surround the light guide plate 22. More in detail, the four LED units 42 are disposed opposite the four outer peripheral edge surfaces of the light guide plate 22, respectively. Namely, the light emitted by the light source 20 enters the light guide plate 22 through the outer peripheral edge surface thereof and travels within each area of the light guide plate 22. Thereafter, the light exits the light guide plate 22 through the front surface 22a, which is a light exit surface, and more specifically, the light exits through the four divided surfaces 22a1, 22a2, 22a3, 22a4 (hereinafter, may be referred to as a light exit surface). The light reflection sheet 26 has a function of reflecting light rays that have leaked through the back surface 22b of the light guide plate 22 toward the light exit surface 22b.

More in detail, each LED unit 42 is disposed opposite one of the four outer peripheral edge surfaces of the light guide plate 22 and extends over the two areas. The LED unit 42 can control the LEDs 42a that are on one edge side with respect to a border between the two areas and the LEDs 42a that are on another edge side independently from each other. The luminance of light rays that enter each of the two areas can be made different, for example.

The frame 28 is attached to the case 30 from the upper side and the frame 28 and the case 30 hold the light reflection sheet 26, the light guide plate 22, and the optical sheet 24 therebetween and also hold the four LED units 42 of the light source 20 therebetween. The bezel 16 is mounted on the case 30 such that the liquid crystal panel 12 and the backlight unit 14 are put together and the liquid crystal display device 10 is obtained.

As described before, the backlight unit 14 of this embodiment includes (A) the light guide plate 22, and (B) the light source 20. The light guide plate 22 includes the groove 40 on at least one of the pair of plate surfaces thereof and the plate surface is divided into areas each including a portion of the outer peripheral surface thereof. The light source 20 supplies light that enters each of the areas through each of the outer peripheral surfaces. The light source 20 controls light rays that enter each of the areas so that luminance of light rays that exit through the light exit surface 22a, which is one of the pair of plate surfaces of the light guide plate 22, can be made different for every area. Therefore, according to the backlight unit 14 including the light guide plate 22 having the groove 40, the light can enter each area that is defined by the groove 40 so that the luminance of light rays that exit through the light exit surface 22a can be made different for every area. Namely, the backlight unit 14 can perform area control of light rays.

The backlight unit 14 includes the groove 40 on the light exit surface 22a of the light guide plate 22. According to the backlight unit 14 of this embodiment, the light exit surface 22a is defined into areas by the groove 40. Therefore, luminance difference near the border between the areas can be made clear.

Furthermore, the light guide plate 22 included in the backlight unit 14 of this embodiment has a quadrangular shape and light from the light source 20 enters the light guide plate 22 through each of the four sides of the outer peripheral surfaces thereof. According to the backlight unit 14 of this embodiment, light enters the light guide plate 22 through entire area of the outer peripheral surfaces thereof. Therefore, luminance of light rays that exit through all of the areas can be effectively ensured.

Furthermore, in the backlight unit 14 of this embodiment, the groove 40 of the light guide plate 22 is relatively deep so that the leaking of light to adjacent areas is less likely to occur. In view of reducing occurrence of leaking of light, it is more effective as the groove becomes deeper. In the backlight unit 14 of this embodiment, the depth of the groove 40 is about 90% of the thickness of the light guide plate 22. Therefore, leaking of light to the adjacent areas can be effectively restricted.

The liquid crystal display device 10 of this embodiment includes the above backlight unit 14 and the liquid crystal panel 12 that displays an image with using light from the backlight unit 14. The liquid crystal panel 12 divides its screen into areas so as to display images (four images in this embodiment) at the same time. The light guide plate 22 of the backlight unit 14 includes the groove 40 along the border between the images that are displayed on the liquid crystal panel 12. Namely, in the liquid crystal display device 10 of this embodiment, the luminance of the backlight unit 14 can be controlled for every image displayed on the liquid crystal panel 12 that can perform multiscreen display. Therefore, sharp images can be displayed clearly.

In the lighting device of this embodiment, the extending direction in which the groove formed in the light guide plate extends is not particularly limited but may be any direction so that each of the areas includes a part of the outer peripheral surface to receive light from the light source. The number of divisions of the light guide plate made by the groove is not limited. For example, the number of the vertical grooves and the lateral grooves may be increased to define much more areas. Furthermore, the groove may be formed on the rear surface of the light guide plate or may be formed on both surfaces thereof.

Second Embodiment

A liquid crystal display device 50 according to a second embodiment is illustrated in FIG. 3. The liquid crystal display device 50 of the second embodiment includes a configuration similar to that of the liquid crystal display device 10 of the first embodiment. Therefore, same components are referred by the same symbols as those of the first embodiment and will not be described.

The liquid crystal display device 50 of the second embodiment differs from the liquid crystal display device 10 of the first embodiment in a configuration of a backlight unit 52, which is the lighting device. More specifically, a configuration of a light source 54 included in the backlight unit 52 is only different from that of the first embodiment. The light source 20 included in the backlight unit 14 of the first embodiment includes four LED units 42 and light enters the light guide plate 22 through the four sides thereof. The light source 54 included in the backlight unit 52 of the second embodiment includes two LED units 56. The configuration thereof is similar to that of the first embodiment and the LED unit 56 includes LEDs 56a and a LED board 56b. The two LED units 56 are arranged opposite two sides (short sides) of the outer peripheral edge surface of the light guide plate 22, respectively, with respect to the long side direction. Namely, light from one of the two LED units 56 enters the light guide plate and exits through the light exit surfaces 22a1, 22a2 that correspond to the first area AA1 and the second area AA2 of the display panel 12. Light from another one of the two LED units 56 enters the light guide plate and exits through the light exit surfaces 22a3, 22a4 that correspond to the third area AA3 and the fourth area AA4 of the display panel 12.

As described before, in the backlight unit 52 of the second embodiment, the light guide plate 22 is quadrangular and light from the light source 54 enters the light guide plate 22 through each of two parallel sides of the outer peripheral surface thereof. Therefore, in the backlight unit 52 of the second embodiment, compared to the backlight unit 14 of the first embodiment, the number of parts can be reduced and the producing process can be simplified.

The invention claimed is:

1. A lighting device comprising:
a light guide plate including a groove on one of a pair of plate surfaces thereof, the groove dividing the one of the pair of plate surfaces into areas each of which includes a portion of an outer peripheral surface; and
a light source providing light such that the light enters each of the areas through the portion of the outer peripheral surface thereof, wherein
the light source is configured to control light that enters each of the areas such that luminance of light exiting the light guide plate through a light exit surface that is one of a pair plate surfaces thereof is made different in each of the areas,
the groove is formed on the light exit surface,
the groove includes grooves that cross each other to define the areas.

2. The lighting device according to claim 1, wherein the light guide plate has a quadrangular shape and the grooves have a cross shape so as to divide the light guide plate into four areas.

3. The lighting device according to claim 1, wherein
the light guide plate has a quadrangular shape, and
the light source supplies light such that the light enters the light guide plate through each of four sides of the outer peripheral surface thereof.

4. The lighting device according to claim 1, wherein
the light guide plate has a quadrangular shape, and
the light source supplies light such that the light enters the light guide plate through each of parallel two sides of the outer peripheral surface thereof.

5. The lighting device according to claim 1, wherein the groove has a depth that is greater than a half of a thickness of the light guide plate.

6. A liquid crystal display device comprising:
the lighting device according to claim 1; and
a liquid crystal panel displaying an image with using light from the lighting device, wherein
the liquid crystal panel includes divided areas in a screen surface thereof and is configured to display images at a same time, and
the light guide plate of the lighting device includes a groove along a border between the images displayed on the liquid crystal panel.

7. A lighting device comprising:
a light guide plate including a groove on one of a pair of plate surfaces thereof, the groove dividing the one of the pair of plate surfaces into areas each of which includes a portion of an outer peripheral surface; and
a light source providing light such that the light enters each of the areas through the portion of the outer peripheral surface thereof, wherein
the light source is configured to control light that enters each of the areas such that luminance of light exiting the light guide plate through a light exit surface that is one of a pair plate surfaces thereof is made different in each of the areas,
the light guide plate has a quadrangular shape, and
the light source supplies light such that the light enters the light guide plate through each of parallel two sides of the outer peripheral surface thereof.

8. The lighting device according to claim 7, wherein
the light source supplies light such that the light enters the light guide plate through each of four sides of the outer peripheral surface thereof.

9. A liquid crystal display device comprising:
the lighting device according to claim 8; and
a liquid crystal panel displaying an image with using light from the lighting device, wherein
the liquid crystal panel includes divided areas in a screen surface thereof and is configured to display images at a same time, and
the light guide plate of the lighting device includes a groove along a border between the images displayed on the liquid crystal panel.

10. The lighting device according to claim 7, wherein the groove has a depth that is greater than a half of a thickness of the light guide plate.

11. A liquid crystal display device comprising:
a lighting device comprising
a light guide plate;
a light source; and
a liquid crystal panel displaying an image with using light from the lighting device,
wherein the light guide plate includes a groove on one of a pair of plate surfaces thereof, the groove dividing the one of the pair of plate surfaces into areas each of which includes a portion of an outer peripheral surface,
the light source provides light such that the light enters each of the areas through the portion of the outer peripheral surface thereof,
the light source is configured to control light that enters each of the areas such that luminance of light exiting the light guide plate through a light exit surface that is one of a pair plate surfaces thereof is made different in each of the areas,
the liquid crystal panel includes divided areas in a screen surface thereof and is configured to display images at a same time, and
the light guide plate of the lighting device includes a groove along a border between the images displayed on the liquid crystal panel.

12. The liquid crystal display device according to claim 11, wherein
the light guide plate has a quadrangular shape, and
the light source supplies light such that the light enters the light guide plate through each of parallel two sides of the outer peripheral surface thereof.

13. The liquid crystal display device according to claim 11, wherein
the groove is formed on the light exit surface,
the groove includes grooves that cross each other to define the areas.

14. The liquid crystal display device according to claim 11, wherein the groove has a depth that is greater than a half of a thickness of the light guide plate.

15. The liquid crystal display device according to claim 11, wherein the light guide plate has a quadrangular shape and the grooves have a cross shape so as to divide the light guide plate into four areas.

16. The liquid crystal display device according to claim 11, wherein
the light guide plate has a quadrangular shape, and
the light source supplies light such that the light enters the light guide plate through each of four sides of the outer peripheral surface thereof.

* * * * *